April 19, 1960 P. R. WESTLAKE 2,933,678

METHOD AND APPARATUS FOR CALIBRATING A MAGNETIC MEDIUM

Filed June 15, 1956 3 Sheets-Sheet 1

INVENTOR.
PHILIP R. WESTLAKE

BY

Christie, Parker & Hale
ATTORNEYS

April 19, 1960 P. R. WESTLAKE 2,933,678

METHOD AND APPARATUS FOR CALIBRATING A MAGNETIC MEDIUM

Filed June 15, 1956 3 Sheets-Sheet 2

INVENTOR.
PHILIP R. WESTLAKE

BY

Christie, Parker & Hale
ATTORNEYS

April 19, 1960 P. R. WESTLAKE 2,933,678

METHOD AND APPARATUS FOR CALIBRATING A MAGNETIC MEDIUM

Filed June 15, 1956 3 Sheets-Sheet 3

INVENTOR.
PHILIP R. WESTLAKE

BY

Christie, Parker & Hale
ATTORNEYS

United States Patent Office 2,933,678

Patented Apr. 19, 1960

2,933,678

METHOD AND APPARATUS FOR CALIBRATING A MAGNETIC MEDIUM

Philip R. Westlake, Altadena, Calif., assignor, by mesne assignments, to Burroughs Corporation, Detroit, Mich., a corporation of Michigan Application June 15, 1956, Serial No. 591,719

10 Claims. (Cl. 324—34)

This invention relates to methods and apparatus for calibrating a magnetizable record.

In data processing systems information is frequently stored upon a magnetizable medium as digital signals in binary code. The information is stored on the magnetizable medium in the form of variations in magnetic intensity. The information is "read" by means of electromagnetic heads which detect the magnetic variations and produce electrical signals which are dependent upon the variations in magnetic intensity. Under certain conditions, however, extraneous signals occur during the reading of recorded data. These extraneous signals are caused by flaws in the magnetic tape or other magnetizable medium. Splices, creases, and any other defect in the magnetizable medium may result in the production of extraneous signals during the reading operation.

In order to obtain reliable information, it is desirable that the sections of the magnetizable medium which contain flaws be discovered and isolated from the remainder of the magnetizable medium. A highly efficient method of calibrating a magnetizable medium is, therefore, highly desirable.

In some arrangements for recording information on a magnetizable medium in a binary code, binary numbers are indicated by changes in the magnetic intensity rather than by different levels of magnetic intensity. For example, the binary digit 0 may be indicated by no change in the magnetic intensity at the address in question and the binary digit 1 may be indicated by a change in the magnetic intensity at the address in question without regard to the polarity of the change. In such a recording arrangement it is particularly important that the information be recorded on portions of the magnetic tape which have no flaws because a flaw would tend to provide an indication of the binary digit 1.

Briefly described, my new arrangement for calibrating a magnetizable record contemplates a series of steps resulting in a calibrated magnetizable record which includes means recorded thereon for identifying sections of the magnetizable record which are flawless. The first step consists of erasing any information initially contained on the magnetizable medium, by first passing the medium forward past the magnetic heads while conducting a unidirectional current through the heads to thereby magnetize the magnetizable medium in one direction throughout its length and width; hence, erasing all previous signals. Secondly, the magnetizable medium is run backward until a section of the magnetizable medium long enough to hold a block of desired information has been found. Any flaws or other extraneous signals are detected as flux changes, and the sections of the medium on which these flux changes occur are rejected. The poor sections are rejected by a counting circuit which keeps track of the amount of good section which has passed under the magnetic heads since the last flaw. If a flaw is detected before the counter circuit has reached a predetermined total number of counts, the counter circuit is automatically reset and begins to count over again.

When a sufficient amount of good section has been found, a signal is emitted from the counter which causes indicia to be recorded on the medium to provide an indication that that portion of the tape is without flaws.

Various types of indicia may be employed. Preferably the indicia provide a numerical indication of the address or location of the portion of the medium in question.

In a preferred embodiment of the invention, the signal which is produced by the counter when a sufficient amount of the medium has been found without flaws causes the direction of movement of the medium to be reversed so that it is moved in the forward direction. During the forward movement of the medium a "block number" and a "marker" are recorded. The block number is a number recorded before each block of recorded information to address or identify the particular block of information. The marker is a series of flux changes in a separate channel which is recorded on the medium during the calibration process, which flux changes may be detected during a reading or search process to indicate that the detected flux changes in the other channels are caused by a block number rather than by recorded data.

After the block number and marker have been recorded, the medium is then again reversed and proceeds in the backward direction. As the recently recorded block number and block marker pass the recording heads they are viewed as flaws, and hence, the search for a good section begins immediately following them. The process is continued until the entire length of magnetizable medium has been calibrated.

In an alternative embodiment of the invention, the indicia which identify usable portions of the magnetizable medium are recorded on the medium as it moves along a single direction and without the forward and backward movement which is described above. This embodiment of the invention requires separate reading and recording transducers spaced from one another along the direction of travel of the magnetizable medium.

For a better understanding of the invention, reference is made to the following detailed description which should be taken in conjunction with the drawings, in which.

During the calibration cycle the tape to be calibrated is first passed in a forward direction under the magnetic heads and the tape is magnetized uniformly so as to erase previously recorded information. Then the tape is moved in the opposite direction and my new electrical system for calibrating magnetic tape proceeds to keep track of the lengths of good tape which pass the heads.

Preferably the bits of information recorded on the tape are identified by block numbers which occur beginning with block number one and proceed successively to the total number of block numbers which can be recorded on the tape. This depends upon the length of tape being utilized and the spacing between the block numbers. The spacing between each block number is determined by the number of words or bits of information that is to be recorded between each block number. For example, 10,000 block numbers might be recorded on the tape with 20 words being recorded between each block number. During the calibration cycle and the recording of the block number it is desirable that the tape be transported backwards, with the largest block number being recorded first and the smallest block number being recorded last.

Figure 1:
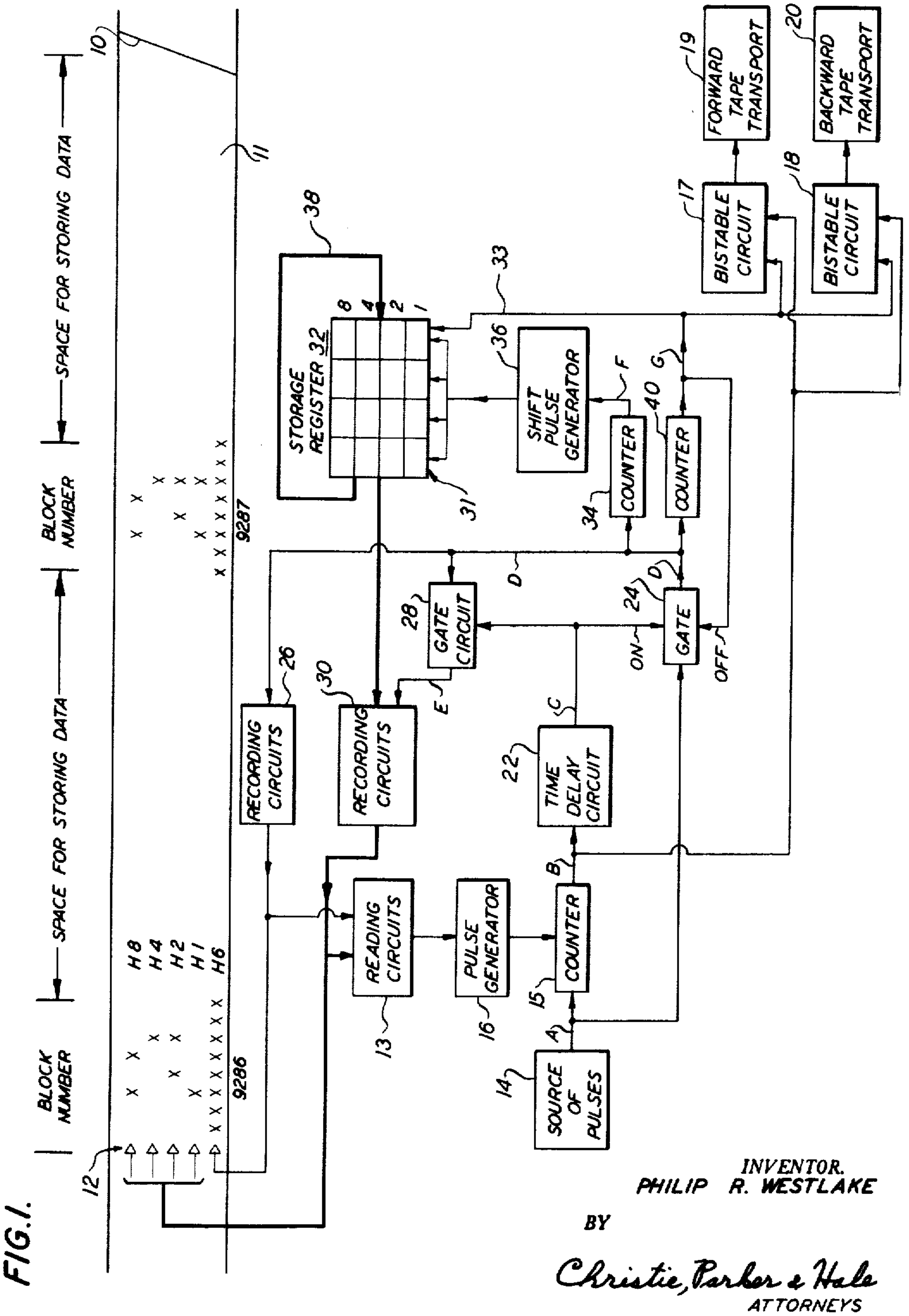
Fig. 1 is a block diagram of one embodiment of an electrical circuit capable of carrying out my new method of calibration with the magnetizable medium calibrated being magnetic tape.
Figure 2:
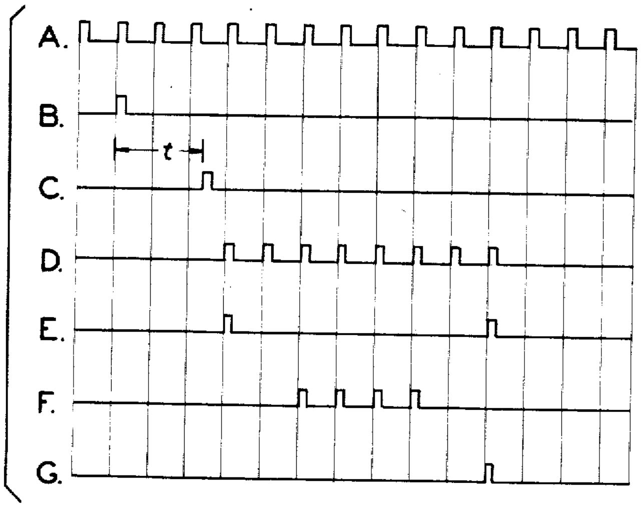
Fig. 2 shows a calibration timing cycle with the letters which identify the signals of Fig. 2 being employed in Fig. 1 to identify the circuits which carry these signals.

Referring more particularly to Fig. 1, a flaw 10, which might be caused, for example, by a crease in the magnetic tape 11, was detected and two flawless portions or blocks of the tape to the left of the flaws were marked off on the tape so as to indicate two portions of the tape which have sufficient length to receive desired blocks of information. Each of the portions of good tape is identified by indicia such as a block number written by the magnetic heads. As shown in Fig. 1, the block numbers 9287 and 9286 have been recorded on the magnetic tape 11 using the binary-decimal notation with a spacing being provided between the block numbers for the recording of data.

To distinguished the location of a block number from material recorded in the other spaces on the magnetic tape 11, a trace $H_6$ is provided consisting of a series of flux changes. Each flux change is identified by an X. An examination of Fig. 1 shows that eight flux changes are recorded in trace $H_6$ as a block marker.

If the binary-decimal system is used, four additional channels are utilized for the purpose of recording the block numbers. These additional channels are identified by $H_1$, $H_2$, $H_4$, and $H_8$. The block numbers are identified by the magnetization on the tape in each particular channel. The subscripts indicate the value to be attributed to a flux change in a particular channel. For example, a flux change in channel $H_8$ is given a value of 8; a flux change in channel $H_4$ is given a value of 4; and so on. The letter X is employed to indicate the binary digit 1 and a blank space is employed to indicate the binary digit 0. It will be apparent that any conventional type of binary-decimal recording arrangement may be employed.

In carrying out my preferred system of calibrating a magnetizable medium the highest block number is placed first in a storage device such as a conventional storage register. An arrangement is provided for recording all of the digits contained in each block number in their proper order as the tape is being moved past the magnetic recording heads. Also, after a particular block number has been recorded, the number which is stored in the storage register is reduced by one count so as to provide the next consecutive lower number.

One electrical system for carrying out this sequence of operations is shown. The magnetic tape 11 is shown located adjacent to a plurality of magnetic heads or transducers 12. Five magnetic heads 12 are employed in the preferred embodiment of the invention to carry out the calibration operation. Other magnetic heads may be present in the system but are unnecessary to the calibration process. A reading circuit 13 is included in the system and it is normally used for reading recorded information. However, during the calibration process the reading circuit 13 is utilized to detect any extraneous signals due to flaws in the tape 11.

A source of pulses 14 provides pulses A to a counter 15 with the counter 15 serving to keep track of the length of good tape which has passed the magnetic heads 12. Preferably the pulses A which are provided by the source 14 occur at a uniform rate. If desired, the movement of the tape 11 may be synchronized with the rate of occurrence of the pulses A.

The source of pulses 14 may be actuated by input pulses obtained from a magnetic drum such as a magnetic drum found in a computer system. The magnetic drum has a plurality of equally spaced magnetized sections so that as the drum is rotated a magnetic head picking up the equally spaced magnetic sections will produce equally spaced pulses.

The counter 15 counts to some preselected total number of counts and then it provides an output pulse B if it is not reset during the counting operation. The counter 15 has a circuit for receiving a reset signal at any time during the counting operation prior to the time that the counter reaches the preselected total number of counts.

If prior to the passing of a sufficient amount of tape a flaw is detected by the magnetic heads 12, a signal is read by the reading circuit 13 and fed to a pulse generator 16, and the output from pulse generator 16 is fed to the counter 15 to reset it so that the counter will not produce an output pulse B at that time.

If the preselected number of counts is registered by the counter 15, it produces an output signal B which indicates that the portion of the tape which has just moved past the heads 12 has a length which is sufficient to store a desired block of data.

The signal B is applied to a pair of bistable circuits 17 and 18 in order to reverse the direction of movement of the tape from the backward direction to the forward direction. The bistable circuit 17 serves to control the operation of the forward tape transport 19, and the bistable circuit 18 serves to control the operation of the backward tape transport 20. The bistable circuit 18 and the backward tape transport 20 are normally actuated to cause the tape to move in a backward direction during the calibration process, and a signal B serves to cause the bistable circuit 18 to deactivate the backward tape transport 20. The bistable circuit 17 and the forward tape transport 19 are normally deactivated during the calibration process and a signal B serves to cause the bistable circuit 17 to actuate the forward tape transport 19 so as to reverse the direction of movement of the tape.

The change of direction of the magnetic tape cannot be achieved instantaneously because of the inertia of the tape transport system. A time-delay circuit 22 compensates for this by providing a time delay $t$ between the signals B which are applied to it and the output signals C which the time delay circuit produces.

The signals C are applied to a normally closed gate 24, and they serve to open the gate so that it passes eight of the pulses A to produce a series of eight signals D at its output.

The signals D are applied to a recording circuit 26 which serves to cause one of the recording heads to produce eight flux changes in the channel $H_6$.

The signals D are also applied to a gate circuit 28 which serves to produce signals E which correspond to the first and last pulses of the signals D. The gate circuit 28 is actuated by the signals C from the time-delay circuit.

The recording circuits 30 also sense the successive digits which are located in the decade 31 of the storage register 32 and cause the magnetic heads to record these digits in the binary coded decimal form in the tracks $H_1$, $H_2$, $H_4$, and $H_8$ on the magnetic tape.

The storage register may be a conventional type having four decades, with one digit being stored in each decade so that the storage register carries a four digit number. The storage register is provided with a conventional arrangement for reducing the stored number by one each time that a signal is applied over the lead 33.

The recording circuits 30 are normally deactivated during the calibration procedure. They may be activated by the first signal E and deactivated by the last signal E provided by the gate circuit 28.

A counter 34 is coupled to receive the signals D, and it produces a series of four signals F at its output which correspond to the third through the sixth pulses of the signals D. These signals F are applied to a shift pulse generator 36 which serves to shift the numbers in the storage register from right to left. The digits which are shifted into the left-hand column 31 are sensed by the recording circuits 30 which cause the digits to be recorded by the heads 12. When the digits are shifted out of the left-hand end of the storage register, they are returned through the loop 38 to the right-hand end of the storage register.

A counter 40 is coupled to receive the signals D, and it serves to produce an output signal G which corresponds to the last of the series of signals D. The signal G is applied to the storage register 32 to reduce the number which is contained in the register by one count, and the signal G is also applied to the gate 24 to turn it off.

The signal G is also applied to the bistable circuits 17 and 18 to reverse their bistable conditions. This causes the bistable circuit 17 to deactivate the forward tape transport 19 and it causes the bistable circuit 18 to activate the backward tape transport 20 so that the tape is again moved in a backward direction until sufficient space is located for storing another block of data.

Thus, the tape is first magnetized uniformly throughout its length by causing the recording circuits to provide uniform signals to the recording heads. Then the tape is moved past the heads 12 from left to right, as viewed in Fig. 1, until sufficient space is located for storing a desired block of data. When such a space is encountered, the counter 15 produces an output signal B which reverses the direction of movement of the magnetic tape. The time-delay circuit produces a signal C which activates the gates 24 and 28 to cause the magnetic heads to record the block number and the block marker as the tape is moved from right to left as viewed in Fig. 1. The signal G is produced by the counter 40 at the end of the recording sequence, and this signal causes the tape transports to reverse the direction of tape movement so that the tape again moves from left to right as viewed in Fig. 1. The signal G also serves to reduce the number in the storage register by one so that the storage register then carries the block number which is to be recorded next.

When the direction of movement of the tape is changed in response to the signal G so that the tape moves from left to right as viewed in Fig. 1, the block number and the block markers which have just been recorded pass under the heads 12. These recorded signals are sensed by the magnetic heads 12 and they produce signals through the reading circuits 13 and the pulse generator 16 which reset the counter 15 so that the counter begins measuring the space for storing data from the left-hand edge of the recorded signals, as viewed in Fig. 1.

Figure 3:
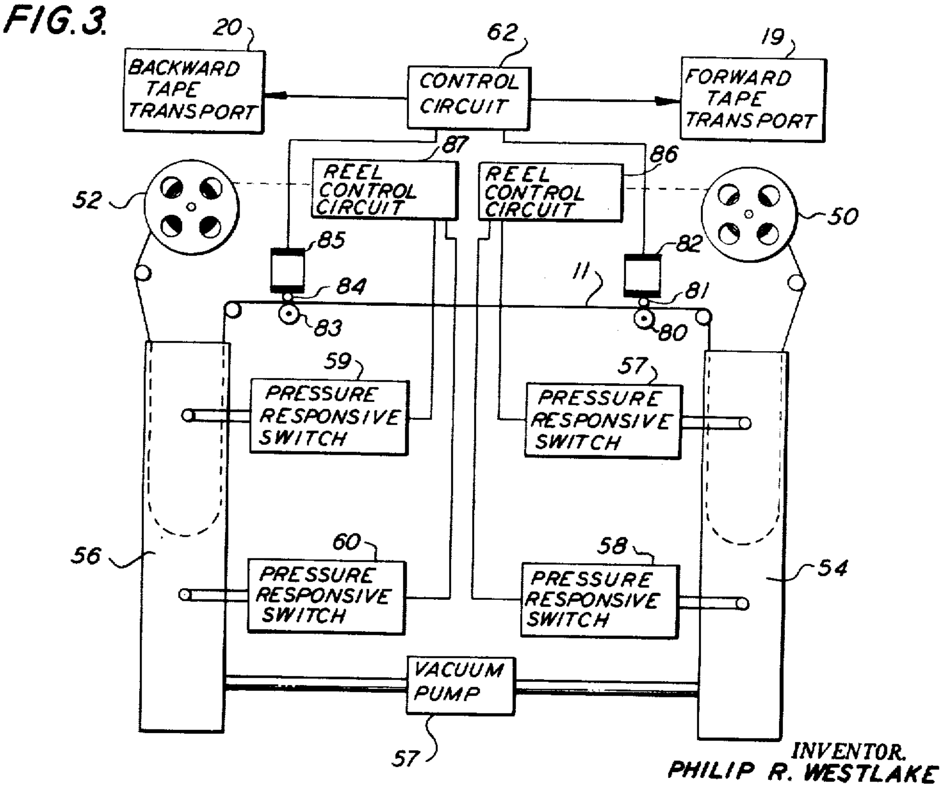
Fig. 3 shows one form of tape transport utilizable in my new system.

The control arrangement of Fig. 1 may be employed in various types of tape handling machines. Fig. 3 illustrates one type of tape transport system which may be employed. The details of such a tape transport system are described in copending application Serial No. 430,334 which was filed May 17, 1954 by Arvo A. Lahti et al. The forward movement of the tape is provided by a forward driving capstan 80 and forward pinch roller 81 actuated by the solenoid 82. The backward movement of the tape is controlled by a reverse driving capstan 83 and a reverse pinch roller 84 actuated by solenoid 85. The solenoids are controlled by control circuit 62 in accordance with signals from tape transport 19 and tape transport 20.

A pair of chambers 54 and 56 are provided for containing slack loops of the tape 11. A vacuum pump 57 is coupled to the lower ends of the chambers for providing a vacuum which serves to pull the slack loops of the tape into the chambers. The magnetic heads may be located along a central portion of the tape intermediate the two slack loops.

The lengths of the slack loops of the tape are controlled by a pair of pressure responsive switches 57 and 58 which are coupled to the chamber 54 at spaced locations, and by a pair of pressure responsive switches 59 and 60 which are coupled to the chamber 56 at spaced locations. The pressure responsive switches 57 and 58 are coupled to a reel control circuit 86 which serves to control the action of the motor driving reel 50, and switches 59 and 60 are coupled to reel control circuit 87 which serves to control the action of the motor driving reel 52 so as to maintain the slack loops of the tape between the locations at which the two pressure responsive switches are coupled to the respective chambers. The pressure difference which exists on each side of the slack loops of tape serves to control the operation of the pressure responsive switches and cause them to provide indications as to the lengths of the slack loops.

Figure 4:
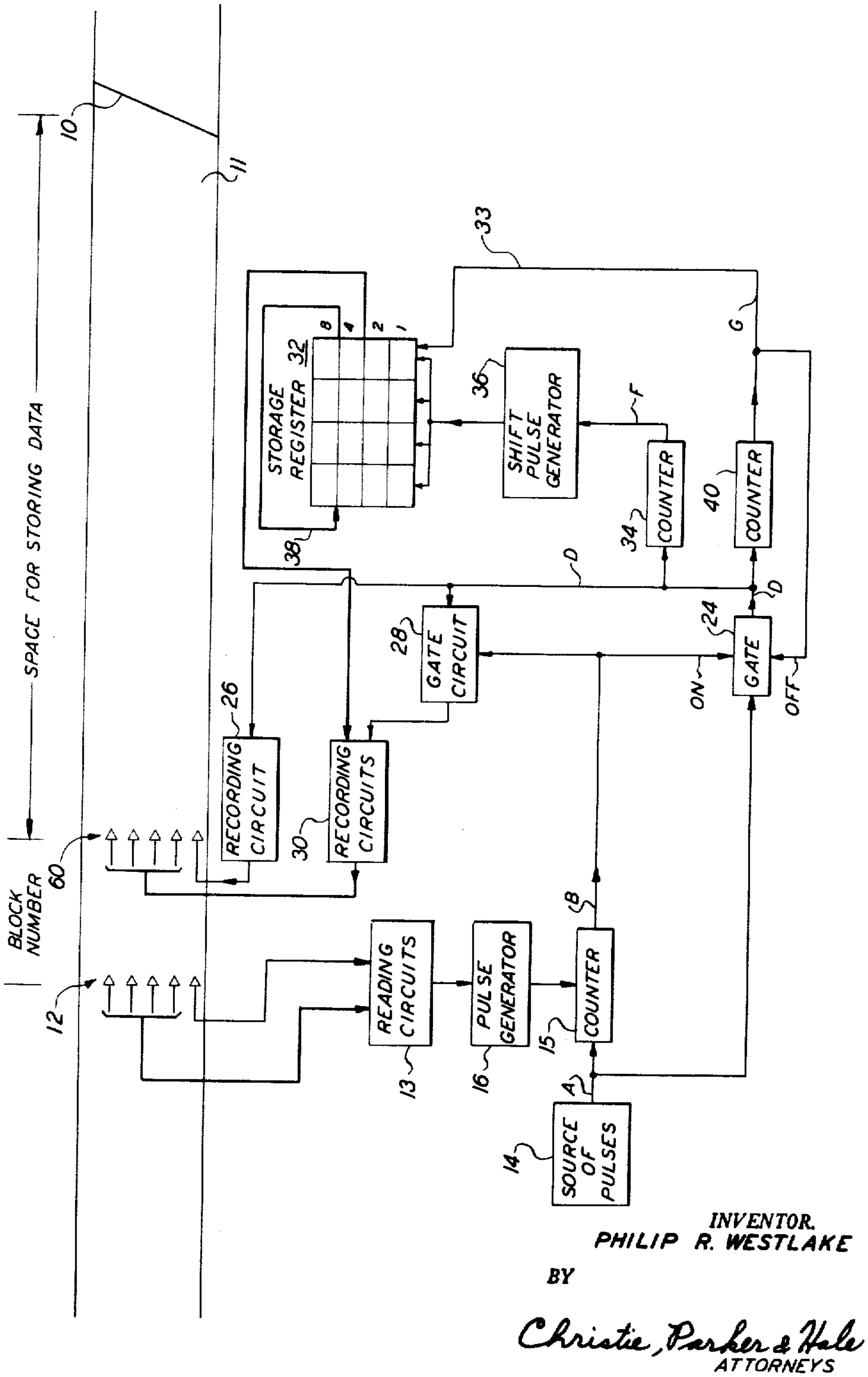
Fig. 4 is a block diagram of a second embodiment of an electrical circuit capable of carrying out my new method of calibration.

Fig. 4 illustrates an alternative electrical system for calibrating magnetic tape in accordance with the present invention. In this embodiment of the invention, the direction of movement of the magnetic tape is not reversed when a sufficient length of tape is located. Separate sets 12 and 60 of magnetic heads are employed to sense the flaws and to record the indicia, and the two sets of magnetic heads are spaced along the magnetic tape in order to produce the desired result. Since the direction of movement of the tape is not reversed, a time-delay circuit is not required.

The other circuit components function in the same manner as discussed above with reference to Fig. 1, with the exception that the information in the storage register is shifted from left to right in the apparatus of Fig. 4 and the recording circuits 30 sense the digit in the right-hand column of the register, and the counter 15 is a ring type which resets itself automatically after the preselected total number of counts has been registered in it. The information in the storage register is shifted from left to right because the digits of the number are recorded in reverse order from the order in which they are recorded in the apparatus of Fig. 1.

The set 12 of magnetic heads is employed to sense the flaws or irregularities in the magnetic tape in order to reset the counter 15 if there is insufficient space for storing a desired block of data.

If there is sufficient space for storing a desired block of data, the counter produces a signal B which activates the system to cause the set 60 of magnetic heads to record the block number and the block marker as discussed above with reference to Fig. 1.

It will be apparent that the block marker may be omitted if some other arrangement is provided for identifying the areas in which the block numbers are recorded.

Also, it will be apparent that various coding arrangements may be employed for recording the block numbers instead of the binary coded decimal arrangement which is illustrated, and that indicia which do not represent a number may be employed if it is not necessary to identify the location or address of the space in which information is to be stored.

I claim:

1. Apparatus for locating portions of a magnetizable medium which are free from imperfections comprising transducer means for sensing and recording information on the medium, counting means for providing an indication when a predetermined number of counts are registered in it, means coupled to the counting means for actuating the counting means, means intercoupling the counting means and the transducer means for resetting the counting means to its initial condition when the transducer means senses an imperfection on the magnetizable medium, transport means for moving the magnetizable medium past the transducer means, and means coupled to the transducer means and responsive to the indication produced by the counting means for causing the transducer means to record indicia on the magnetizable medium each time that the counting means registers said predetermined number of counts.

2. Apparatus for locating portions of a recording medium which are free from imperfections comprising transducer means for sensing and recording information on the medium, counting means for providing an indication when a predetermined number of counts are registered in it, means coupled to the counting means for actuating the counting means, means intercoupling the counting means and the transducer means for resetting the counting means to its initial condition when the transducer means senses an imperfection on the medium, transport means for moving the medium past the transducer means, and means coupled to the transducer means and responsive to the indication produced by the counting means for causing the transducer means to record indicia on the medium each time that the counting means registers said predetermined number of counts.

3. Apparatus for locating portions of a magnetizable medium which are free from imperfections comprising means for recording a substantially uniform magnetic signal along the magnetizable medium, measuring means for measuring spaces along the magnetizable medium which are of sufficient length to store predetermined blocks of data, means for sensing the intensity of said magnetic signal along the magnetizable medium, and means intercoupling the sensing means and the measuring means for resetting the measuring means to an initial condition in response to each irregularity in the magnetic signal which is sensed by the sensing means.

4. Apparatus for locating portions of a recording medium which are free from imperfections comprising means for recording a substantially uniform signal along the medium, measuring means for measuring spaces along the medium which are of sufficient length to store predetermined blocks of data, means for sensing said signal along the medium, and means intercoupling the sensing means and the measuring means for resetting the measuring means to an initial condition in response to each irregularity in the signal which is sensed by the sensing means.

5. Apparatus for locating portions of a magnetizable medium which are free from imperfections comprising transducer means for sensing and recording information on the medium, counting means for providing an output signal when a predetermined number of counts are registered in it, means coupled to the counting means for actuating the counting means at a substantially constant rate, means intercoupling the counting means and the transducer means for resetting the counting means to its initial condition when the transducer means senses a signal on the magnetizable medium, transport means for moving the magnetizable medium past the transducer means, means coupled to the transport means and responsive to the output signal produced by the counting means for reversing the direction of movement of the magnetic medium, means coupled to the transducer means and responsive to the output signal produced by the counting means for causing the transducer means to record indicia on the magnetizable medium while the magnetic medium is moving in the reverse direction, and means coupled to the transport means for again reversing the direction of movement of the magnetic medium after the indicia have been recorded.

6. In a system for identifying portions of a magnetizable medium which are free from imperfections, means for moving the magnetizable medium past a plurality of magnetic heads positioned adjacent to the magnetizable medium, a counter circuit adapted to receive a preselected number of equally spaced input pulses and then emit an output pulse, electrical transport control means coupled to the counter circuit and responsive to the output pulse to reverse the direction of movement of the magnetizable medium, a recording circuit connected to the magnetic heads, means interconnecting the recording circuit and the counter circuit responsive to said output pulse to activate the recording circuit, timing counter means also connected between the counter circuit and the recording circuit, the timing counter means being activated by said output pulse to control the sequential recording on the magnetizable medium of a plurality of identifying numbers, said timing counter means being also connected to the transport control means to reverse the movement of the magnetizable medium after the identifying numbers have been recorded, said counter circuit having a reset circuit which is coupled to the magnetic heads to receive any signals sensed by the heads so that any imperfections occurring on the magnetizable medium prior to the emission of the output pulse from the counter circuit will cause the counter circuit to be reset.

7. Apparatus for locating portions of a magnetic tape which are free from imperfections comprising means for recording a substantially uniform magnetic signal along the tape, transducer means for sensing and recording information on the tape, counting means for providing an output signal when a predetermined number of counts are registered in it, means coupled to the counting means for actuating it at a substantially constant rate, means intercoupling the counting means and the transducer means for resetting the counting means to its initial condition when the transducer means senses an irregularity in the substantially uniform magnetic signal on the tape, transport means for moving the tape past the transducer means, means coupled to the transport means and responsive to the output signal produced by the counting means for reversing the direction of movement of the tape, a storage register for storing block numbers representative of locations along the tape in which predetermined blocks of information may be stored, means coupling the storage register to the transducer means, control means responsive to the output signal produced by the counting means for causing the transducer means to record the number which is in the storage register while the tape is moving in the reverse direction and for providing a control signal at the end of the recording cycle, means intercoupling the control means and the storage register and responsive to the control signal for changing the number in the storage register to the next number to be recorded, and means intercoupling the control means and the transport means and responsive to said control signal for reversing the direction of movement of the tape at the end of the recording cycle after the block number has been recorded.

8. Apparatus for locating portions of a magnetic tape which are free from imperfections comprising means for recording a substantially uniform magnetic signal along the tape, a plurality of transducers for sensing and recording information on the tape, counting means for providing an output signal when a predetermined number of counts are registered in it, means coupled to the counting means for actuating it at a substantially constant rate, means intercoupling the counting means and the transducers for resetting the counting means to its initial condition when the transducers sense an irregularity in the substantially uniform magnetic signal on the tape, transport means for moving the tape past the transducers, means coupled to the transport means and responsive to the output signal produced by the counting means for reversing the direction of movement of the tape, a storage register for storing block numbers representative of locations along the tape in which predetermined blocks of information may be stored, means coupling the storage register to the transducers, control means responsive to the output signal produced by the counting means for causing the transducers to record the number which is in the storage register while the tape is moving in the reverse direction and for providing a control signal at the end of the recording cycle, recording means responsive to the output signal produced by the counting means for recording a series of flux changes in one channel to serve as a block marker, means intercoupling the control means and the storage register and responsive to the control signal at the end of the recording cycle for changing the number in the storage register to the next number to be recorded, and means intercoupling the control means and the transport means and responsive to said control signal at the end of the recording cycle for reversing the direction of movement of the tape after the block number has been recorded.

9. A method for calibrating and identifying preselected lengths of a magnetic tape, including the steps of passing the tape in a first given direction through a uniform magnetic field for erasing the tape, passing the thus erased tape in a second given direction past means for sensing variations in magnetization of the tape while passing the erased tape in the second direction, measuring off portions of the tape having a preselected length free from substantial variations in magnetization, and upon measuring a portion having a preselected length passing the erased tape in the first direction and recording markers on the tape identifying only the preselected lengths of variation free portions.

10. A method for calibrating and addressing a magnetizable tape, including the steps of passing the tape through a uniform magnetic field, passing the tape adjacent means for sensing variations in magnetization of the tape, measuring distances along the tape between variations in magnetization sensed by said variation sensing means, and marking addresses on the tape identifying predetermined lengths of tape which are substantially variation free.

References Cited in the file of this patent

UNITED STATES PATENTS

| | | |
|---|---|---|
| 2,055,672 | Roop | Sept. 29, 1936 |
| 2,143,672 | Archibald | Jan. 10, 1939 |
| 2,410,803 | Barnes et al. | Nov. 12, 1946 |
| 2,628,346 | Burkhart | Feb. 10, 1953 |
| 2,793,344 | Reynolds | May 21, 1957 |
| 2,813,259 | Burkhart | Nov. 12, 1957 |
| 2,817,829 | Lubkin | Dec. 24, 1957 |